United States Patent [19]

Morita et al.

[11] 4,034,281
[45] July 5, 1977

[54] DIRECT CURRENT POWER SUPPLY WITH A TRANSISTOR CHOPPER

[75] Inventors: Kouichi Morita; Hirohito Sekine; Takao Ubukata, all of Niiza, Japan

[73] Assignee: Sanken Electric Company Limited, Niiza, Japan

[22] Filed: Mar. 17, 1975

[21] Appl. No.: 559,216

[30] Foreign Application Priority Data

July 25, 1974 Japan .................... 49-85761

[52] U.S. Cl. .................... 323/17; 323/9; 323/DIG. 1; 363/124; 363/16
[51] Int. Cl.² .................... G05F 1/58
[58] Field of Search .......... 321/2, 16, 18; 323/9, 323/17, 22 T, 38, DIG. 1

[56] References Cited

UNITED STATES PATENTS

| | | | |
|---|---|---|---|
| 2,920,259 | 1/1960 | Light | 323/DIG. 1 |
| 2,994,029 | 7/1961 | Bixby | 323/9 |
| 3,005,147 | 10/1961 | Thomas | 323/9 |
| 3,115,600 | 12/1963 | Brolin | 323/DIG. 1 |
| 3,273,050 | 9/1966 | Pratt | 323/DIG. 1 |
| 3,548,291 | 12/1970 | Heaslett | 323/22 T |
| 3,566,253 | 2/1971 | O'Neill | 323/DIG. 1 |
| 3,628,047 | 12/1971 | Cronin et al. | 323/DIG. 1 |
| 3,638,103 | 1/1972 | Birchenough | 323/DIG. 1 |
| 3,641,424 | 2/1972 | Kuykendall | 323/DIG. 1 |
| 3,684,924 | 8/1972 | Miller | 323/9 X |
| 3,742,371 | 6/1973 | Seibt et al. | 323/DIG. 1 |
| 3,809,998 | 5/1974 | Mansson | 323/22 T |
| 3,819,986 | 6/1974 | Fukuoka | 323/DIG. 1 |

*Primary Examiner*—A. D. Pellinen
*Attorney, Agent, or Firm*—Woodcock, Washburn, Kurtz & Mackiewicz

[57] ABSTRACT

A source of direct current has its opposite polarity terminals connected to an electrical load via a transistor functioning as a chopper. A reactor is provided which comprises a primary winding also connected between the DC source and the load, a secondary winding adapted to apply a biasing voltage across the base and emitter of the transistor, and a tertiary winding constituting a part of the energy release circuit through which the energy stored in the reactor during each conducting period of the transistor is released. A base control circuit in the form of, for instance, a voltage regulating diode is connected to the base of the transistor. The transistor performs the desired "chopping" or current interrupting function to permit the delivery of substantially constant DC power from the DC source to the load.

1 Claim, 25 Drawing Figures

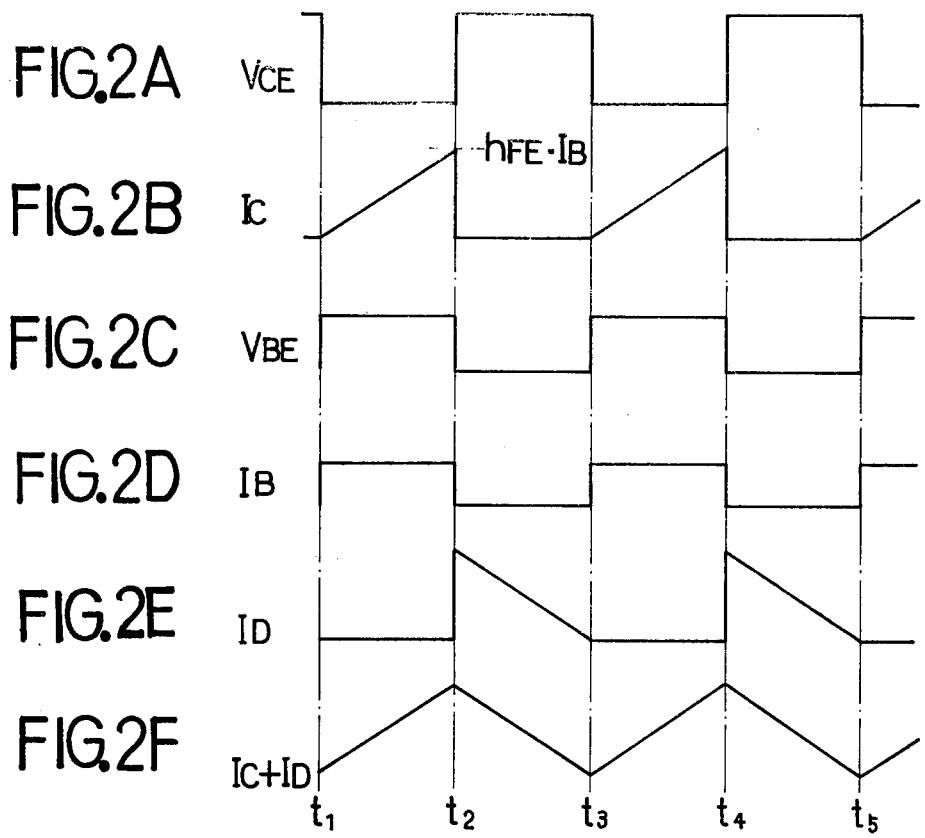
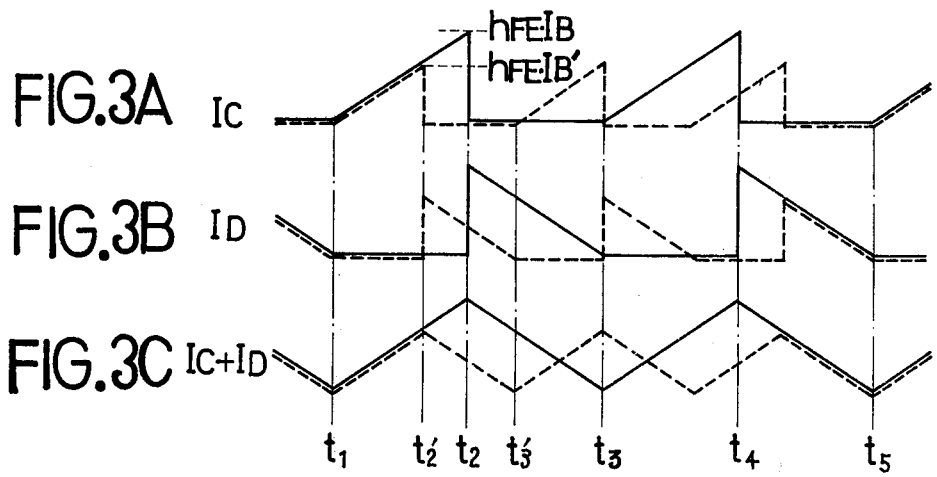

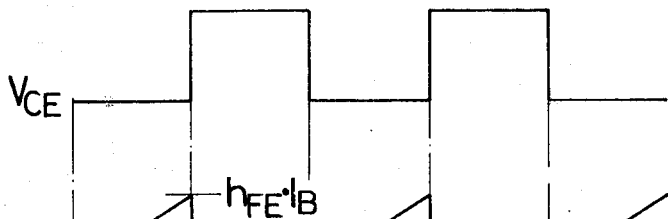
FIG.12A $V_{CE}$
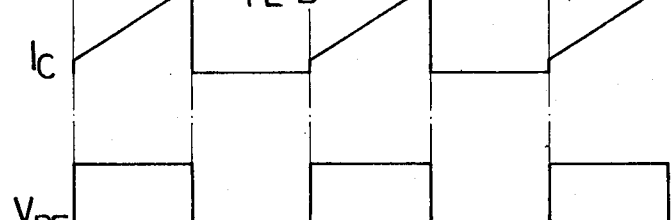
FIG.12B $I_C$    $h_{FE} \cdot I_B$
FIG.12C $V_{BE}$
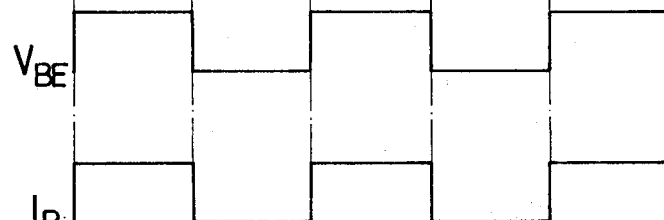
FIG.12D $I_B$
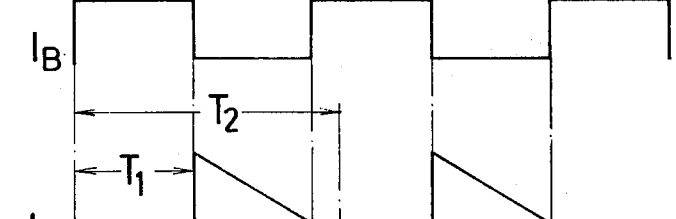
FIG.12E $I_D$    $T_1$   $T_2$
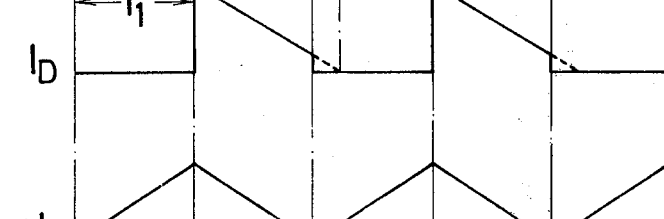
FIG.12F $I_C + I_D$
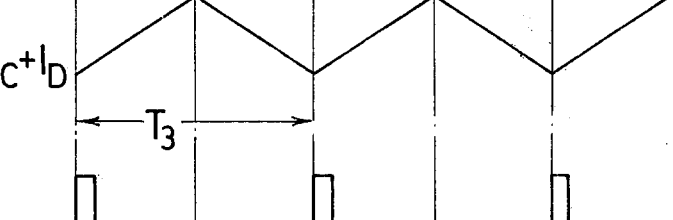
$T_3$
FIG.12G SYNC PULSES
$t_1$   $t_2$   $t_3$   $t_4$   $t_5$

DIRECT CURRENT POWER SUPPLY WITH A TRANSISTOR CHOPPER

BACKGROUND OF THE INVENTION

This invention relates generally to direct current (DC) power supplies for delivering power from a DC source to an electrical load, and more specifically to a DC power supply including a transistor which is connected between the DC source and the load and which functions as a chopper to maintain a constant DC voltage or current output within limits.

There has been known a DC power supply including a transistor chopper connected between DC source and load. The transistor in use is periodically switched on and off for the controlled supply of DC power to the load. Extremely low power loss is one of the most pronounced advantages of this type of DC power supply over other types. However, the DC power supply as heretofore constructed requires a pulse generator as well as a pulse duration modulator for the desired switching operation of the transistor, so that the overall system inevitably becomes complex and expensive in construction.

SUMMARY OF THE INVENTION

It is, therefore, among the objects of this invention to provide a DC power supply including a transistor chopper for the delivery of substantially constant DC voltage or current from a DC source to an electrical load, the transistor being adapted to perform the "chopping" function without the aid of a pulse generator or a pulse duration modulator, so that the DC power supply is made materially simpler and less expensive in construction than the prior art power supplies of like class.

Another object of the invention is to provide a DC power supply which can be smoothly set in operation by means of a starting current of minimum magnitude.

A further object of the invention is to provide a DC power supply which is effectively protected from the effects of overcurrent.

A further object of the invention is to provide a DC power supply which is capable of providing a plurality of DC voltage outputs of different levels.

A further object of the invention is to provide a DC power supply in which the transistor can be caused to perform the chopping function in step with synchronizing pulses.

It is also an object of this invention to provide a DC power supply which is particularly well adaptable for use with or in a television receiver.

With these objects in view and the other objects hereinafter set forth, this invention provides a DC power supply including a transistor connected between a DC source such as a battery or rectifier and an electrical load. A reactor is provided which comprises at least a primary winding connected between the DC source and the load, and a secondary winding adapted to apply a biasing voltage across the base and emitter of the transistor. The DC power supply further comprises energy release circuit means through which the electrical energy stored in the reactor is released, starting circuit means for applying a starting current to the transistor, and base control means for controlling the base current of the transistor. The general circuit configuration of the DC power supply is such that the transistor functions as a chopper for the supply of stabilized DC power to the load.

The features which are believed to be novel and characteristic of this invention are set forth in particular in the claims appended hereto. The invention itself, however, both as to its organization and mode of operation, together with the further objects and advantages thereof, will become apparent in the course of the following description of specific embodiments which is to be read in connection with the accompanying drawings in which like reference characters refer to like parts throughout.

BRIEF DESCRIPTION OF THE DRAWINGS

FIGS. 2A to 2F, inclusive, are a graphical summary of waveforms plotted by way of explanation of the normal operation of the DC power supply shown in FIG. 1;

FIGS. 3A to 3C, inclusive, are a graphical summary of waveforms plotted by way of explanation of the operation of the DC power supply shown in FIG. 1 in the event of the change in load voltage;

FIGS. 12A to 12G, inclusive, are a graphical summary of waveforms plotted by way of explanation of the operation of the DC power supply shown in FIG. 11.

DESCRIPTION OF THE PREFERRED EMBODIMENTS

Figure 1:
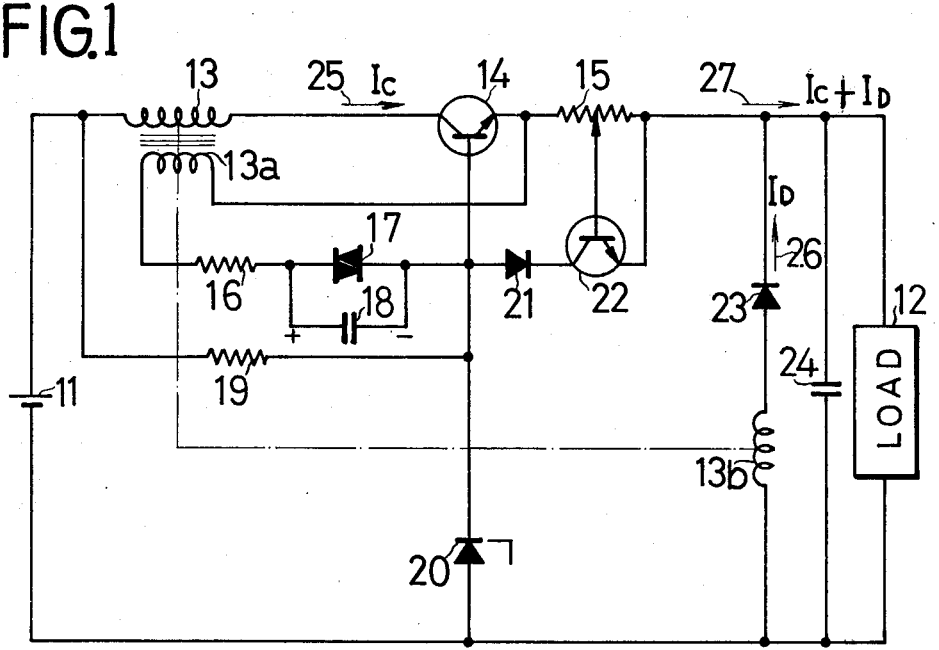
FIG. 1 is a schematic electrical diagram of a DC power supply configured in accordance with the novel concepts of this invention.

With reference to FIG. 1, the DC power supply schematically illustrated therein by way of a first preferred embodiment of this invention includes a source of direct current 11 which, in practice, will take the form of a battery or a rectifier. An electrical load 12 to be fed from the DC source 11 is connected across the opposite polarity terminals of the DC source. Connected serially between the DC source 11 and the load 12 are a reactor winding 13, an NPN transistor 14 designed to function as a chopper, and an overcurrent detecting resistor 15.

While the reactor winding 13, transistor 14 and resistor 15 are shown to be connected in the positive line connecting the DC source 11 to the load 12, all or some selected ones thereof can be connected in the negative line. It is also possible, within the scope of this invention, to connect the reactor winding 13 between the transistor 14 and the load 12, or to connect the reactor winding on the negative side of the DC source 11.

The reactor winding 13 is associated with a secondary winding 13a and a tertiary winding 13b which are carried by the same reactor core as the winding 13 functioning as the primary. All these reactor windings 13, 13a and 13b are magnetically coupled to each other. The secondary reactor winding 13a has one of its extremities connected to the emitter of the transistor 14 and the other extremity to its base via a resistor 16 and a varistor 17. The varistor 17 has a threshold voltage of about 0.6 volt in both positive and negative directions. A capacitor 18 is connected in parallel with the varistor 17. A resistor 19 is connected between one of the terminals of the DC source 11 and the base of the transistor 14 and thus constitutes a principal part of a starting circuit, as will be later explained.

A voltage regulating diode 20 is connected between the base of the transistor 14 and the negative line connecting the DC source 11 to the electrical load 12. This diode is a principal part of the base control circuit of the transistor 14 later described in more detail. A series circuit of diode 21 and transistor 22 is connected between the base of the transistor 14 and one extremity of the overcurrent detecting resistor 15 away from the transistor 14 for dividing the base current of the transistor 14 upon detection of overcurrent by the resistor 15 and hence for terminating conduction through the transistor.

The tertiary reactor winding 13b is connected in parallel with the load 12 via a diode 23. The tertiary reactor winding 13b and the diode 23 are intended to form an energy release circuit through which the electrical energy stored in the reactor is released to the load 12. This circuit also functions as a filter. A smoothing capacitor 24 is also connected in parallel with the load 12.

Listed below by way of reference are some pertinent technical data concerning the circuit components of FIG. 1:

| | |
|---|---|
| DC source 11 | Output voltage 48 V. |
| Electrical load 12 | Voltage and current requirements 24 V and about 3 A. |
| Primary reactor winding 13 | 65 turns. |
| Secondary reactor winding 13a | 15 turns. |
| Tertiary reactor winding 13b | 65 turns. |
| Transistor 14 | Collector-base voltage with emitter open-circuited $V_{CBO}$ 140 V, collector current $I_C$ 10 A, collector dissipation $P_C$ 100 W, DC current gain $h_{FE}$ at least 30. |
| Resistor 15 | 0.5 Ω. |
| Resistor 16 | 30 Ω. |
| Varistor 17 | Threshold voltage 0.6 V. |
| Capacitor 18 | 0.47 mfd. |
| Resistor 19 | 20 kΩ. |
| Voltage regulating diode 20 | Zener breakdown voltage about 26 V. |
| Diode 21 | Forward current $I_f$ 1 A. |
| Transistor 22 | Collector-base voltage with emitter open-circuited $V_{CBO}$ 80 V, collector current $I_C$ 4 A, collector dissipation $P_C$ 25 W, DC current gain $h_{FE}$ at least 40. |
| Diode 23 | Forward current $I_f$ 5 A. |
| Capacitor 24 | 2,000 mfd. |

The operation of the DC power supply shown in FIG. 1 will now be described with reference directed also to FIGS. 2A to 2F, inclusive, and FIGS. 3A to 3C, inclusive. The DC power supply can be set in operation as an electric current first flows from the DC source 11 to the base of the transistor 14 via the starting resistor 19. Upon the resulting initiation of conduction through the transistor 14, a collector current $I_C$ starts flowing through the primary reactor winding 13 as indicated by the arrow 25 in the drawing. As a result of this collector current, there is induced in the secondary reactor winding 13a a voltage the value of which is determined by the ratio of the number of turns of the primary and secondary reactor winding respectively. The voltage induced in the secondary reactor winding is impressed across the base and emitter of the transistor 14 through a path traced from the secondary reactor winding through the resistor 16, the varistor 17, the transistor 14 and back to the secondary reactor winding, so that the transistor 14 is held conductive.

In the graphic representations of waveforms given combinedly as FIGS. 2A to 2F, the indicia $t1$ denote the starting moment of the operation of the DC power supply. It will be seen from FIG. 2A that the voltage $V_{CE}$ across the collector and emitter of the transistor 14 becomes approximately zero at the starting moment $t1$ as then conduction is initiated therethrough. The collector current $I_C$ starts flowing as previously mentioned, and its magnitude progressively increases for some time after the starting moment, as represented in FIG. 2B. The voltage $V_{BE}$ across the base and emitter of the transistor remains substantially constant, as represented in FIG. 2C, and the base current $I_B$ also remains substantially constant, as in FIG. 2D. The current $I_D$ to flow through the diode 23, indicated by the arrow 26 in FIG. 1, remains zero as in FIG. 2E. The output current $I_C+I_D$, indicated by the arrow 27 in FIG. 1, flowing to the load immediately after the starting moment $t1$ is therefore as represented in FIG. 2F.

It is noteworthy that the DC power supply according to the invention has a highly favorable starting characteristic, due for the most part to the provision of the varistor 17 connected in series with the secondary reactor winding 13a. The varistor itself consists of a parallel connection of two oppositely directed diodes with a voltage-dependent nonlinear resistance. As the threshold voltage of this varistor is set at about 0.6 volt as aforesaid, and since the threshold voltage across the base and emitter of the transistor 14 is also about 0.6 volt, the current initially supplied from the DC source 11 can be delivered almost completely to the base of the transistor 14 via the starting resistor 19. No substantial part of the starting current flows off into the circuit of the secondary reactor winding 13a via the varistor 17. It is therefore possible to minimize the magnitude of the current flowing through the starting resistor 19.

The desired "chopping" or current interrupting operation of the transistor 14 can be initiated not only by the starting current delivered through the resistor 19 as herein disclosed but by a pulse impressed to the base of the transistor from a suitable source of such pulses. In the latter case, too, the pulse current can be of minimum magnitude.

No further increase in the collector current $I_C$ of the transistor 14 becomes possible after it has increased to the product $h_{FE} \cdot I_B$ of the DC current gain $h_{FE}$ of the transistor and the base current $I_B$, as indicated in FIG. 2B, because the base current supplied principally from the secondary reactor winding 13a is constant. The transistor 14, no longer capable of maintaining its conductive state, is thereupon set out of saturation. As a consequence, the voltage across its collector and emitter rises, whereas the voltage across both extremities of the primary reactor winding 13 drops. Since the voltage induced in the secondary reactor winding 13a also drops corespondingly, the resulting decrease in the base current of the transistor 14 causes nonconduction therethrough. This is the moment designated t2 in the waveform diagrams of FIGS. 2A to 2F.

With the transistor 14 thus rendered nonconductive, the electrical energy $-\frac{1}{2}Li^2$ (where L is the inductance of the reactor and $i$ the value of the current that has been flowing therethrough) which has been stored in the reactor is released to the load 12 from its tertiary winding 13b. In other words, the energy stored in the reactor is released to the aforementioned energy release circuit, that is, the closed path comprising the tertiary reactor winding 13b, the diode 23 and the load 12.

FIG. 2E represents the waveform of the current $I_D$ flowing through the tertiary reactor winding 13b. During the time interval of t2 to t3, when the current $I_D$ is flowing, a voltage is induced in the secondary reactor winding 13a in its reverse direction. The transistor 14 is thus reverse biased across its base and emitter against the forward bias from the starting resistor 19, with the result that the transistor is held nonconductive from the moment t2 to t3.

When the flow of the current $I_D$ ceases at the moment t3, the transistor 14 is no longer reverse biased and again becomes conductive. It will be appreciated that this switching from the nonconductive to conductive state of the transistor 14 can be easily accomplished by virtue of the base current $I_B$ supplied via the starting resistor 19. However, the same purpose is attainable even without the supply of the base current via the starting resistor 19. While the exact reason for this is not yet confirmed, the following explanation seems most reasonable.

Upon cessation of the flow of the current $I_D$, the direction of movement of the carriers that have been stored in the diode 23 is reversed, thereby causing current flow through the tertiary reactor winding 13b in the opposite direction to that of the current $I_D$. There is consequently induced in the secondary reactor winding 13a a voltage of such polarity as to cause conduction through the transistor 14, and conduction is actually initiated therethrough by a slight base current caused by that voltage.

As may have been understood from the foregoing description, the transistor 14 becomes conductive at the moment t3, non-conductive at the moment t4, conductive again at the moment t5, and so forth. The DC voltage is thereby chopped as graphically represented in FIG. 2A and is supplied to the load 12 by being smoothed by the capacitor 24 and the tertiary reactor winding 13b. It will be seen that the level of the DV voltage supplied to the load is determined by the voltage regulating diode 20 constituting the principal part of the base control circuit of the transistor 14.

Described hereinbelow is the operation of the DC power supply in the event of fluctuations in load voltage. Assume that the voltage across both terminals of the load 12 has risen while the power supply is operating in the manner best represented by the waveforms of the currents $I_C$, $I_D$ and $I_C+I_D$ as indicated by the solid lines in FIGS. 3A, 3B and 3C respectively. As the emitter voltage of the transistor 14 resultantly rises correspondingly, the base current $I_B$ decreases, because the transistor is assumed to be of the NPN type. This decrease is caused as a fraction of the base current flows off to the voltage regulating diode 20.

If the base current of the transistor 14 decreases from $I_B$ to $I_B'$, the peak value of the collector current $I_C$ that can be caused to flow by this decreased base current also decreases from $h_{FE} \cdot I_B$ to $h_{FE} \cdot I_B'$, as indicated in FIG. 3A. It will therefore be understood that the dashed lines in FIGS. 3A to 3C represent the waveforms of the currents $I_C$, $I_D$ and $I_C+I_D$ flowing upon increase in the voltage across both terminals of the load 12.

Referring to FIGS. 3A to 3C in more detail, conduction through the transistor 14 terminates at the moment t2', which precedes the moment t2, as the peak value of the collector current $I_C$ decreases from $h_{FE} \cdot I_{IB}$ to $h_{FE} \cdot I_B'$. The transistor 14 is therefore held conductive for a shorter time interval of t1 to t2'. As each conducting period of the transistor shortens, less electrical energy is stored in the reactor, so that the current $I_D$ is zeroed at the moment t3' preceding the moment t3. Conduction is again initiated through the transistor 14 at this moment t3'. Since the peak value of the collector current is held low in this manner, the mean valve of the current delivered to the load decreases. The voltage across both terminals of the load 12 therefore drops to the predetermined level.

In event the voltage across both terminals of the load 12 has dropped below the predetermined level, on the other hand, the current that flows to the voltage regulating diode 20 decreases, as will be apparent from the foregoing description. The increase in the base current of the transistor 14 results in the increase in its collector current, so that the load voltage rises back to the predetermined level.

The above description of the process of voltage regulation in the DC power supply according to the invention is substantially applicable to that of current regulation.

The DC power supply shown in FIG. 1 can further be effectively protected from the effects of overcurrent. When the load 12 is short circuited, the output voltage of the DC source 11 is impressed to the primary reactor winding 13 and the transistor 14. If then the transistor 14 is conductive, almost all of the DC voltage will be impressed to the primary reactor winding 13. This increase in the voltage between both extremities of the primary reactor winding results in the corresponding increase in the voltage induced in the secondary reactor winding 13a, so that the base current $I_B$ of the transistor 14 also increases.

As the collection current $I_C$ of the transistor 14 exceeds the predetermined level in the above described manner, the voltage drop in the overcurrent detecting resistor 15 increases. Since the overcurrent detecting resistor 15 has the tap connected to the base of the transistor 22, conduction is initiated through this transistor as the voltage in excess of the threshold voltage across its base and emitter is impressed. Upon conduction of the transistor 22, part of the base current that has been delivered to the transistor 14 from the secondary reactor winding 13a bypasses the transistor 14 and flows off into the circuit comprising the diode 21 and the transistor 22. The resulting decrease in the base current of the transistor 14 causes nonconduction therethrough. The DC power supply is thus protected from the effects of the overcurrent flowing in the event of the short-circuiting of the load 12.

It should be noted that the transistor 14 is doubly protected from overcurrent by the capacitor 18 connected in parallel with the varistor 17. Were it not for this capacitor, the short-circuiting of the load 12 would result in the decrease in the emitter voltage of the transistor 14 even in its nonconducting period. Since the transistor 14 is of the NPN type, the base current would then flow to cause the flow of the collector current therethrough, so that the transistor might eventually be destroyed.

Actually, however, the capacitor 18 connected in parallel with the varistor 17 is charged, with the polarity as indicated in FIG. 1, during each conducting period of the transistor 14. As this transistor becomes nonconductive, the capacitor functions to apply a reverse bias across the base and emitter of the transistor and hence to prevent the flow of current therethrough during the nonconducting period. The transistor 14 is thus protected against destruction resulting from the short-circuiting of the load 12. The voltage to be charged in the capacitor 18 can be set approximately equal to the threshold voltage of the varistor 17, that is, at about 0.6 volt.

Figure 4:
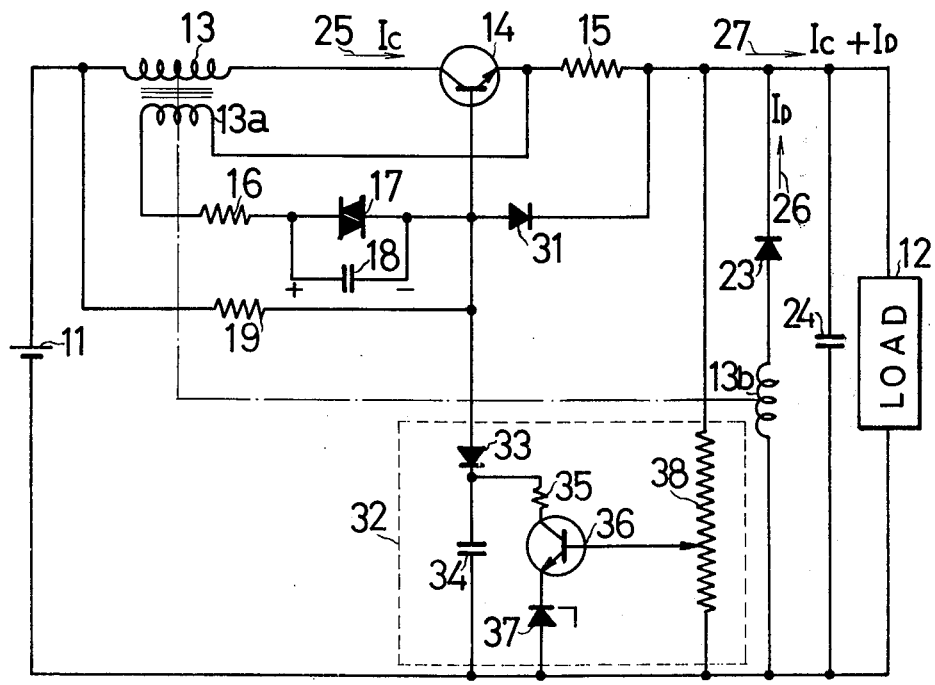
FIG. 4 is a schematic electrical circuit diagram showing another DC power supply configured in accordance with the invention.

FIG. 4 illustrates another preferred embodiment of the invention which incorporates different current dividing means for protecting the transistor 14 from overcurrent and different base control means for the same transistor. The rest of the circuit is arranged as in the preceding embodiment for essentially the same operation.

For protection of the transistor 14 from the effects of overcurrent, the DC power supply of FIG. 4 includes a diode 31 connected between one extremity of the overcurrent detecting resistor 15, remote from the transistor 14, and the base of this transistor. The diode 31 permits current flow therethrough when applied with a voltage in excess of its predetermined threshold voltage as a result of the flow of overcurrent through the resistor 15. Since then part of the base current that has been delivered to the transistor 14 from the secondary reactor winding 13a flows off through the diode 31, the transistor becomes nonconductive and hence is protected from the effects of overcurrent.

The modified base control circuit of the transistor 14, surrounded by the dashed lines and labeled 32 in FIG. 4, includes a diode 33 connected to the base of the transistor 14. A capacitor 34 is connected between the diode 33 and the negative line connecting the DC source 11 to the load 12. Resistor 35, transistor 36 and voltage regulating diode 37 are connected serially to each other and in parallel relationship to the capacitor 34. A voltage detecting resistor 38 is connected across the terminals of the load 12. It will be seen that the voltage detecting resistor 38 has a tap connected to the base of the transistor 36.

The base control circuit 32 of the foregoing configuration is designed to perform essentially the same functions as the voltage regulating diode 20 shown in FIG. 1. If the voltage across both terminals of the load 12 rises above the predetermined level, the voltage applied to the transistor 36 from the resistor 38 will also rise. The resulting decrease in the resistance between the collector and emitter of the transistor 36 causes the flow of greater collector current therethrough. Part of the base current that has been supplied from the secondary reactor winding 13a to the transistor 14 is thus delivered to the transistor 36 via the diode 33. In this manner the peak value of the collector current of the transistor 14 decreases, for example, to $h_{FE} \cdot I_B'$, as indicated in FIG. 3A. It will now be apparent that the voltage across both terminals of the load 12 can be lowered to the predetermined level through the succeeding procedure already set forth in connection with the FIG. 1 embodiment.

Figure 5:
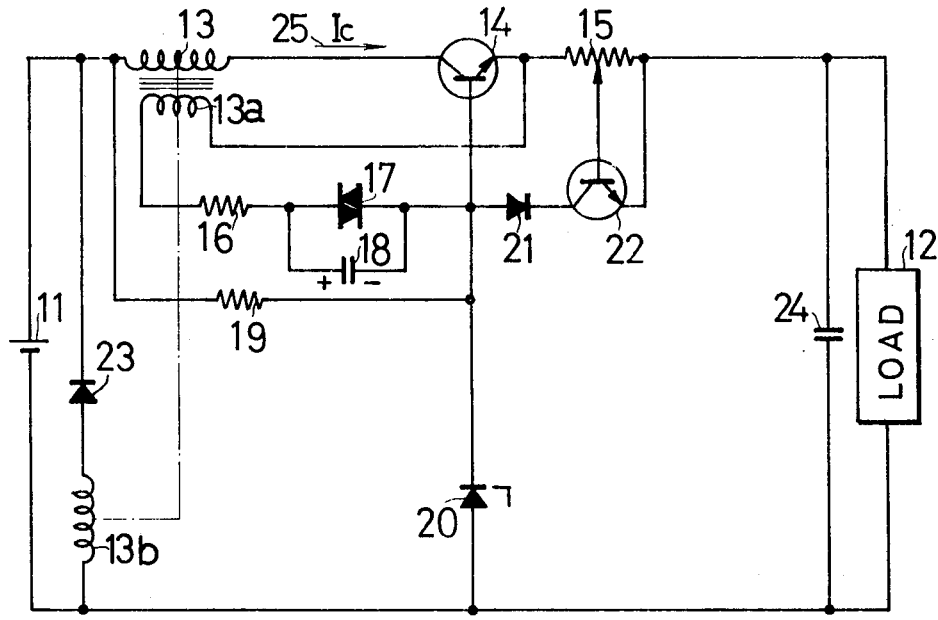
FIG. 5 is a schematic electrical circuit diagram showing another DC power supply configured in accordance with the invention.

FIG. 5 illustrates a slight modification of the FIG. 1 embodiment, in which the series circuit of tertiary reactor winding 13b and diode 23 is connected in parallel with the DC source 11. The tertiary reactor winding 13b, of course, is magnetically coupled to the primary and secondary reactor windings 13 and 13a. This configuration is designed to permit the energy stored in the reactor to be fed back expeditiously to the DC source 11 from the tertiary reactor winding 13b.

Figure 6:
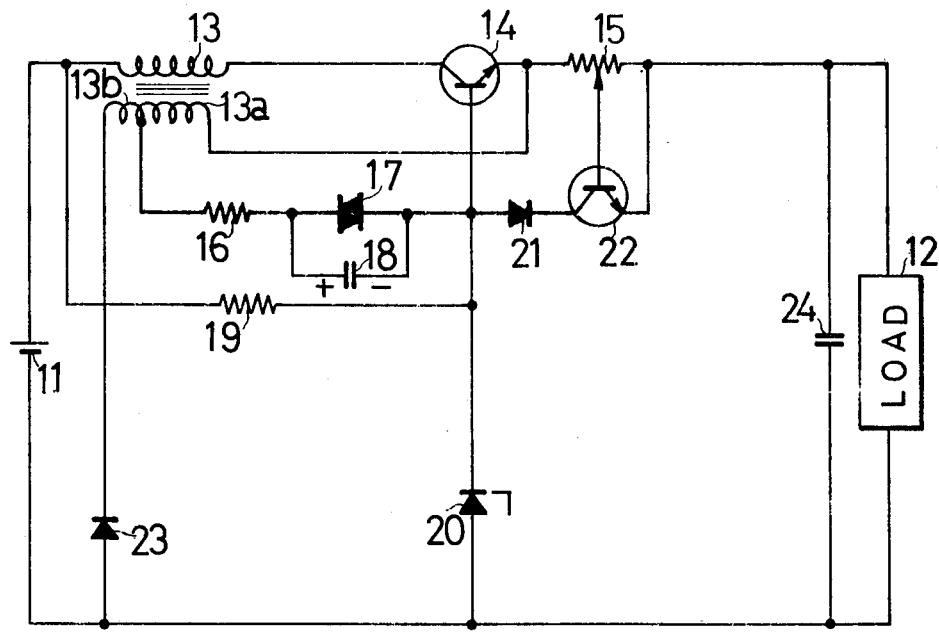
FIG. 6 is a schematic electrical circuit diagram showing another DC power supply configured in accordance with the invention.

In a further preferred embodiment of the invention shown in FIG. 6, the secondary and tertiary reactor windings 13a and 13b are connected together like the primary and secondary coils of an autotransformer. The diode 23 is connected between the tertiary reactor winding 13b and the negative line connecting the DC source 11 to the load 12. This embodiment may be considered a modification of the FIG. 1 embodiment because the tertiary reactor winding 13b is arranged in parallel relationship to the load 12. Other details of circuit configuration are exactly the same as those of the FIG. 1 or 5 embodiment. It will be understood that this configuration of FIG. 6 permits the same operation of the DC power supply as that above explained in conjunction with the FIG. 1 embodiment.

Figure 7:
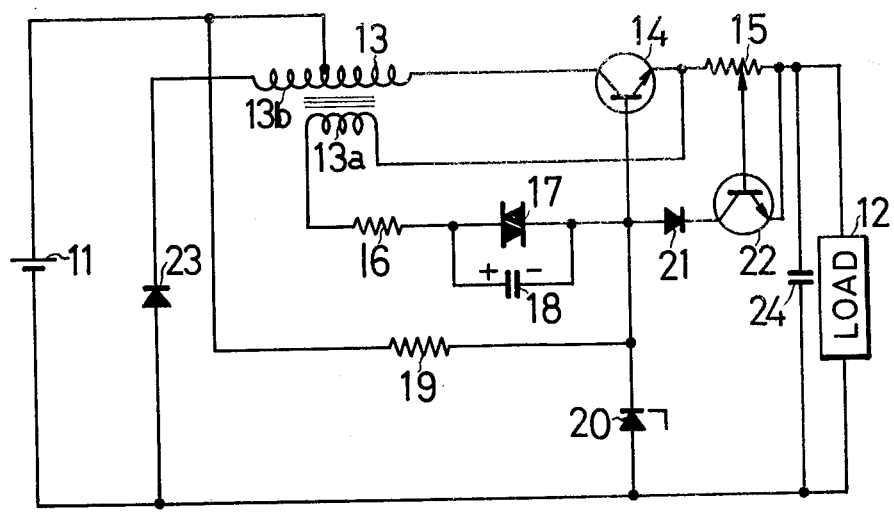
FIG. 7 is a schematic electrical circuit diagram showing another DC power supply configured in accordance with the invention.

FIG. 7 illustrates a further preferred embodiment of the invention which is similar to that shown in FIG. 6, in that the primary and tertiary reactor windings 13 and 13b are connected together like the primary and secondary coils of an autotransformer. Also as in the FIG. 6 embodiment, the diode 23 is connected between the tertiary reactor winding 13b and the negative line connecting the DC source 11 to the load 12. This FIG. 7 embodiment, however, is perhaps closest to that shown in FIG. 5 because, in both embodiments, the tertiary reactor winding 13b is arranged in parallel relationship to the DC source 11. Other details of circuit configuration are exactly the same as those of the FIG. 1, 5 or 6 embodiment. This arrangement permits the energy stored in the reactor to be fed back to the DC source 11 from its tertiary winding 13b, as in the FIG. 5 embodiment.

Figure 8:
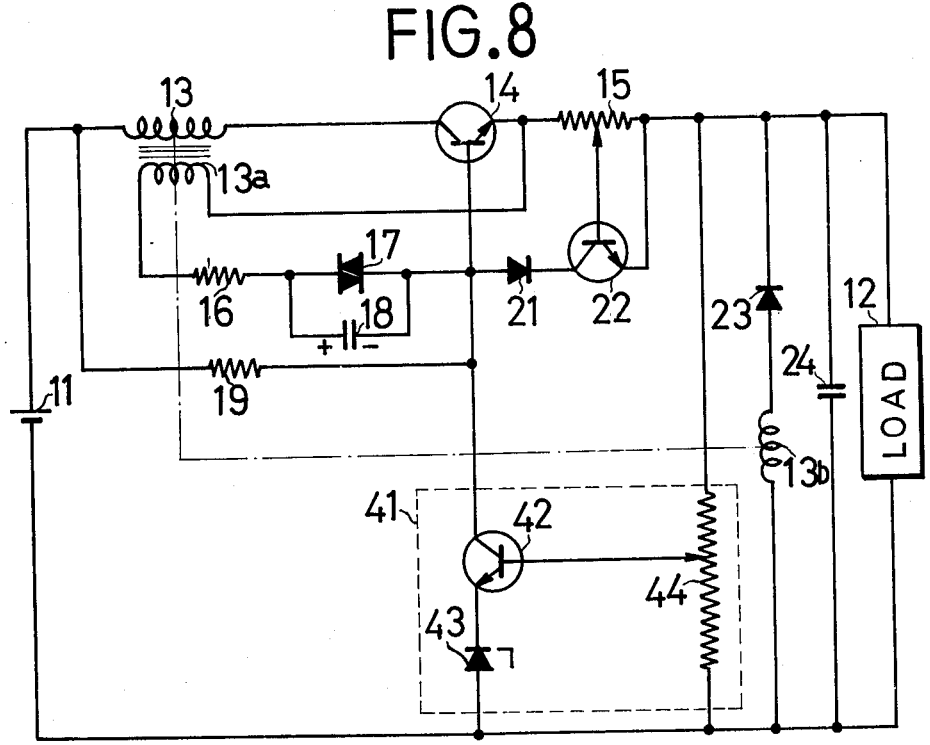
FIG. 8 is a schematic electrical circuit diagram showing still another DC power supply configured in accordance with the invention.

The circuit configuration of FIG. 8 includes a modified example of base control circuit for the transistor 14. The modified base control circuit 41, which is substituted for the voltage regulating diode 20 in FIG. 1, includes a transistor 42 the collector of which is connected to the base of the transistor 14. A voltage regulating diode 43 is connected between the emitter of the transistor 42 and the negative line extending between DC source 11 and load 12. The base of the transistor 42 is connected to the tap on a voltage detecting resistor 44 which is connected across both terminals of the load 12 to detect the voltage applied thereto. It will be apparent that the base current of the transistor 14 can be controlled by this base control circuit 41 functioning in essentially the same manner as the base control circuit 32 shown in FIG. 4.

Figure 9:
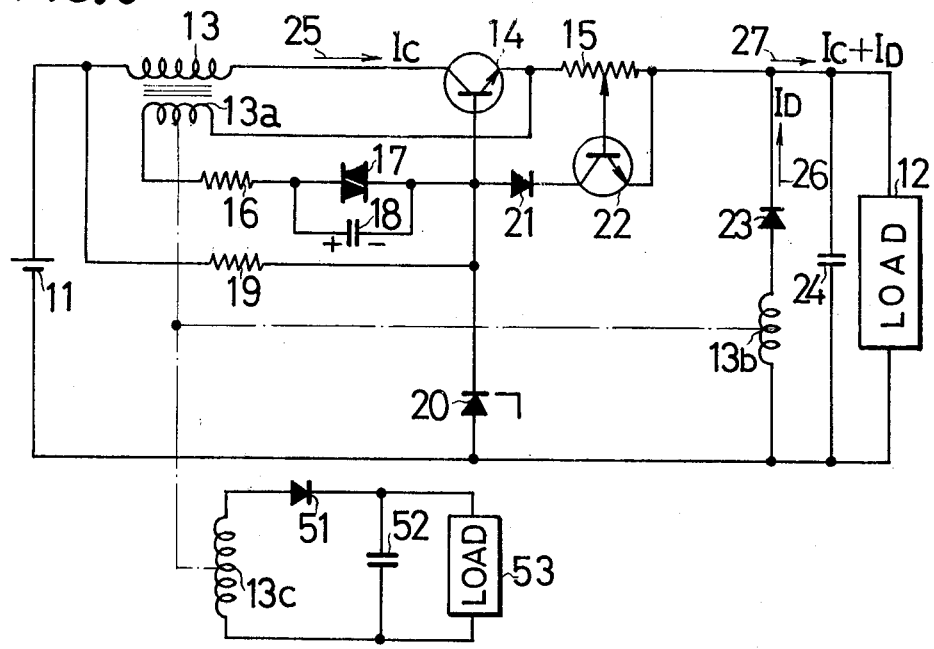
FIG. 9 is a schematic electrical circuit diagram showing a further DC power supply configured in accordance with the invention.

A further preferred embodiment of the invention shown in FIG. 9 is adapted to supply constant DC power not only to the load 12 but to a second electrical load 53. For this purpose a fourth reactor winding 13c is provided which is magnetically coupled to the primary, secondary and tertiary reactor windings 13, 13a and 13b and which is connected across both terminals of the second load 53. A rectifying diode 51 is connected between the fourth reactor winding 13c and the second load 53, and a smoothing capacitor 52 is connected in parallel with the latter. Other details are exactly identical with those of the FIG. 1 embodiment.

According to the circuit configuration of FIG. 9, the diode 23 becomes conductive when the transistor 14 is rendered nonconductive, so that the regulated voltage is impressed across both extremities of the tertiary reactor winding 13b. Since then a regulated voltage is further induced in the fourth reactor winding 13c, this voltage is applied to the second load 53 by being rectified and smoothed by the diode 51 and capacitor 52. It is possible in this manner to supply substantially constant voltages to the two loads. Notwithstanding the showing of FIG. 9, the fourth reactor winding 13c can be connected to the secondary or tertiary reactor winding 13a or 13b like the coils of an auto-transformer.

Figure 10:
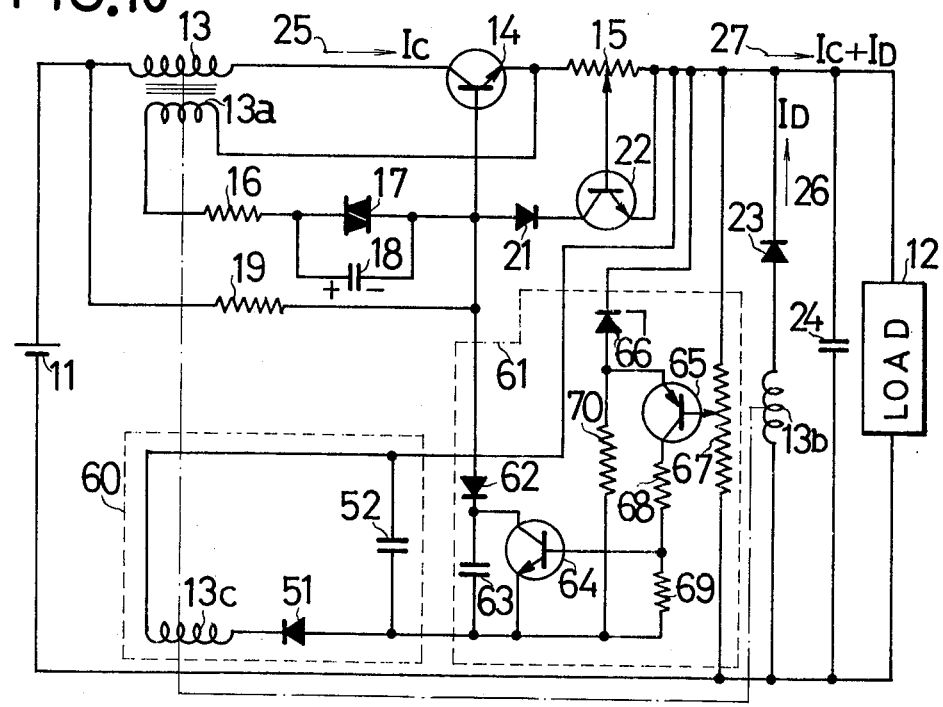
FIG. 10 is a schematic electrical circuit diagram showing yet another DC power supply configured in accordance with the invention.

FIG. 10 illustrates a further preferred embodiment of the invention which also incorporates the circuit composed of the fourth reactor winding 13c, the rectifying diode 51 and the smoothing capacitor 52. This circuit, labeled 60 in FIG. 10, is connected to a further modified example of base control circuit, generally designated 61, for the transistor 14 so that the circuit 60 will function as a biasing voltage source for the modified base control circuit 61. The base control circuit 61 comprises diode 62, capacitor 63, transistors 64 and 65, voltage regulating diode 66, and resistors 67, 68, 69 and 70, which are connected as shown in the drawing.

As previously mentioned in connection with FIG. 9, a voltage is induced in the fourth reactor winding 13c of the biasing voltage source 60 when the transistor 14 is nonconductive. If the output voltage of this biasing voltage source is assumed to be 6 volts, a biasing voltage of about 10 volts can be applied to the transistor 64 of the base control circuit 61. For, in the circuit traced from the voltage source 60 to the transistor 64, the voltage rises about 4.6 volt across the resistor 15 and transistor 14 and drops about 0.6 volt across the diode 62. The biasing voltage of about 10 volts is therefore impressed across the collector and emitter of the transistor 64. A biasing voltage of about 6 volts is also applied to the circuit comprising the voltage regulating diode 66, the transistor 65 and the resistors 68, 69 and 70.

If the voltage across both terminals of the load 12 rises above the predetermined level while the base control circuit is biased as set forth in the preceding paragraph, the resistor 67 connected in parallel with the load detects the voltage rise to cause the increase in the collector current of the transistor 65. Since then the transistor 64 permits the easier flow of collector current therethrough, part of the base current that has been flowing from the secondary reactor winding 13a to the transistor 14 flows off to the transistor 64. The collector current of the transistor 14 thus decreases, with the result that the voltage across both terminals of the load 12 returns to the predetermined level.

One of the features of this FIG. 10 embodiment is that the biasing voltage delivered to the base control circuit 61 is not determined by the voltage as supplied by the DC source 11 or by the voltage drawn by the load 12 but by the output voltage of the biasing voltage source 60 including the fourth reactor winding 13c. The output voltage of the source 60 can be made suitably low to minimize the power loss in the base control circuit 61. Furthermore, this base control circuit can be highly economical of manufacture, as it can be formed of components with a relatively low voltage-withstanding property. While the fourth reactor winding 13c is shown to be provided in addition to the other three reactor windings 13, 13a and 13b in FIG. 10, modification is possible in which the reactor winding 13c performs the function of the secondary or tertiary as well.

Figure 11:
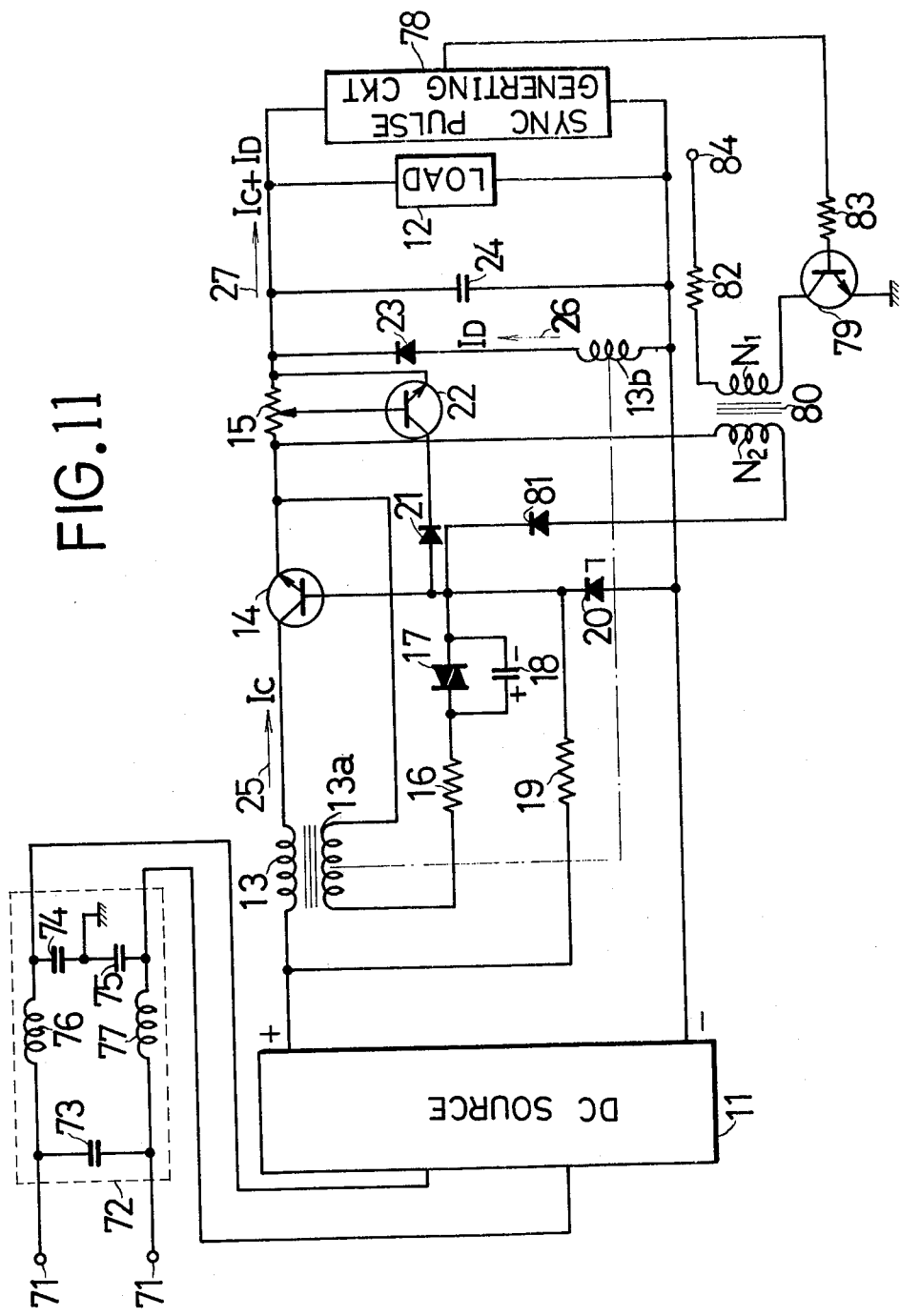
FIG. 11 is a schematic electrical circuit diagram showing still a further DC power supply configured in accordance with the invention.

In FIG. 11 the invention is specifically adapted for the power supply circuit of a television receiver. The DC source 11 in this particular adaptation of the invention takes the form of a rectifier which is connected to a pair of AC supply terminals 71. Connected between the AC supply terminals 71 and the rectifier 11 is a filter 72 comprising capacitors 73, 74 and 75 and inductance coils 76 and 77 which are connected as in the drawing for purposes hereinafter made apparent.

Besides the load 12, a sync (synchronizing) pulse generating circuit 78 is connected across the opposite polarity terminals of the rectifier 11 as an additional load of this DC power supply. In practice, the horizontal sync pulse generator of the television receiver can be employed as the sync pulse generating circuit 78. The horizontal sync pulses generated by this circuit are delivered not only to the horizontal deflection circuit, not shown, but to the base of the transistor 14. For the delivery of the sync pulses to the transistor 14, there is connected between this transistor and the sync pulse generating circuit 78 a circuit comprising transistor 79, transformer 80 with its primary and secondary windings N1 and N2, diode 81, and resistors 82 and 83. A positive supply terminal 84 is connected to the transformer primary N1 via the resistor 82. Other details of circuit configuration are exactly as above described in connection with the FIG. 1 embodiment in particular.

The technical data concerning the circuit components of FIG. 11 are given below by way of reference:

| | |
|---|---|
| DC source 11 | Output voltage 135 V. |
| Electrical load 12 | Voltage and current requirements 110 V and about 1.5 A. |
| Primary reactor winding 13 | 33 turns. |
| Secondary reactor winding 13a | 7 turns. |
| Tertiary reactor winding 13b | 66 turns. |
| Transistor 14 | Collector-base voltage with emitter open-circuited $V_{CBO}$ 500 V, collector current $I_C$ 8 A, collector dissipation $P_C$ 80 W, DC current gain $h_{FE}$ at least 10. |
| Resistor 15 | 1Ω. |
| Resistor 16 | 200Ω. |
| Varistor 17 | Threshold voltage 0.6 V. |
| Capacitor 18 | 10 mfd. |
| Resistor 19 | 47 kΩ. |
| Voltage regulating diode 20 | Zener breakdown voltage about 112 V. |
| Diode 21 | Forward current $I_f$ 1 A. |
| Transistor 22 | $V_{CBO}$ 80 V, $I_C$ 4 A, $P_C$ 25 W, $h_{FE}$ at least 40. |
| Diode 23 | $I_f$ 5 A. |
| Capacitor 24 | 150 mfd. |
| AC supply terminals 71 | AC 100 V. |
| Filter 72 | Suppressed frequency 15.75 kHz. |
| Sync pulse generating circuit 78 | Signal frequency 15.75 kHz. |

-continued

| | |
|---|---|
| Transistor 79 | $V_{CBO}$ 100 V, $I_C$ 4 A, $P_C$ 25 W, $h_{FE}$ at least 40. |
| Primary transformer winding N1 | 50 turns. |
| Secondary transformer winding N2 | 50 turns. |
| Diode 81 | $I_f$ 1 A. |
| Resistor 82 | 20Ω. |
| Resistor 83 | 4.7 kΩ. |
| Terminal 84 | 24 V. |

The operation of the embodiment shown in FIG. 11 will now be described with reference directed also to FIGS. 12A to 12G. Upon delivery of AC power to the DC source or rectifier 11 from the AC supply terminals 71, the power supply operates to supply to the load 12 and the sync pulse generating circuit 78 the substantially constant voltage obtained by the chopping operation of the transistor 14 as in the preceding embodiments of the invention. The sync pulse generating circuit 78, thus actuated, produces the sync pulses graphically represented in FIG. 12G.

These sync pulses are successively impressed to the base of the transistor 79 via the resistor 83 thereby causing current flow through the primary N1 of the transformer 80. The voltage induced resultantly in the transformer secondary N2 is impressed across the base and emitter of the transistor 14 via the diode 81. The transistor 14 is thus compulsorily rendered conductive.

In the circuit configuration of FIG. 11, the recurring cycle T2 of the intrinsic switching operation of the transistor 14 (that is, the switching operation that would be performed by the transistor if no sync pulse were applied thereto) is asumed to be equal to or longer than the cycle T3 of the sync pulses generated by the circuit 78, and the sync pulse cycle T3 to be longer than each conducting period T1 of the transistor 14. Hence $T1 < T3 \leq T2$. The cycle T2 of the intrinsic switching operation of the transistor 14 is adjustable by varyng the value of the base current $I_B$ or the DC current gain $h_{FE}$. The operation of the transistor 14 may not at first synchronize with the sync pulses delivered thereto as aforesaid. However, as long as the relation $T1 < T3 \leq T2$ exists, the synchronization is bound to occur sooner or later.

Referring more specifically to FIGS. 12A to 12G, it is now assumed that one sync pulse is impressed to the transistor 14 at the moment $t1$ to initiate conduction therethrough. The transistor 14 remains conductive even after the duration of the sync pulse, because then the base current is supplied thereto from the secondary reactor winding 13a. The voltage $V_{CE}$ across the collector and emitter of the transistor 14 is held substantially at zero, as represented in FIG. 12A, while the collector current $I_C$ gradually increases, as in FIG. 12B. Since the constant voltage $V_{BE}$ is impressed across the base and emitter of the transistor 14 from the secondary reactor winding 13a, as seen in FIG. 12C, the constant base current $I_B$ flows as in FIG. 12D. FIG. 12E shows no current $I_D$ flowing through the diode 23 during the conducting period of the transistor 14, as then the diode is reverse biased.

When the collector current $I_C$ of the transistor 14 assumes the value $h_{FE} \cdot I_B$, the transistor becomes nonconductive, as previously explained in connection with FIGS. 2A to 2F. The transistor 14, thus rendered nonconductive at the moment $t2$ in FIGS. 12A to 12G, is thereafter held in that state by being reverse biased due to the energy release from the reactor. The voltage that has been induced in the tertiary reactor winding 13b causes the flow of current $I_D$ through the diode 23 during the nonconducting period of the transistor 14, as seen in FIG. 12E. Consequently, the output current $I_C + I_D$ assumes the waveform as graphically represented in FIG. 12F.

As long as the current $I_D$ is flowing, the transistor 14 is held reverse biased and thus tends to remain nonconductive. However, upon delivery of the next sync pulse at the moment $t3$ before the current $I_D$ becomes zero, that is, before the end of one cycle T2, conduction is again compulsorily initiated through the transistor 14. In this manner the transistor 14 is held conductive from $t3$ to $t4$, nonconductive from $t4$ to $t5$, and so forth. It will now be apparent that the transistor 14 performs the chopping operation in step with the sync pulses delivered to its base from the secondary N2 of the transformer 80.

With the chopping operation of the transistor 14 thus synchronized with the sync pulses, the filter 72, tuned for example to 15.75 kHz to suppress the noise signal resulting from the horizontal sync pulses generated by the circuit 78 as set forth in the preceding table, is doubly effective to suppress the noise that will arise from the chopped output from the transistor 14. No noise will thus be permitted to pass on to other circuits connected in the preceding stage of the AC supply terminals 71.

If the cycle of the aforesaid intrinsic switching operation of the transistor 14 could be perfectly adjusted to the cycle of the sync pulses, it would be unnecessary to utilize the output from the horizontal sync pulse generator of the television receiver for this purpose. Actually, however, the purpose is difficult to realize, so that the arrangement of FIG. 11 is advisable, if not essential.

While the DC power supply according to this invention has been shown and described herein in very specific aspects thereof, it it understood that the invention itself is not to be restricted by the exact showing of the drawings or the description thereof, as it is open to various modifications within the usual knowledge of those skilled in the art. For example, in the circuit configuration shown in FIGS. 1 and 4 to 9, starting pulses may be applied across the base and emitter of the transistor 14 instead of the current delivered thereto via the starting resistor 19. The primary reactor winding 13 in the various embodiments of the invention can be connected in other positions than that shown in the drawings, and the tertiary reactor winding 13b can be dispensed with if the primary winding is connected in the succeeding stage of the transistor 14, for example, between the diode 23 and the capacitor 24 in the circuit configuration of FIG. 1. It is also possible to employ the so-called Darlington connection of transistors in place of the transistor 14.

Thus, a latitude of modification, substitution and change is intended in the foregoing disclosure. It is therefore appropriate that the invention be construed broadly and in a manner consistent with the fair meaning or proper scope of the following claims.

What we claim is:

1. A direct current power supply for supplying substantially stabilized direct current power to an electrical load comprising, in combination:
   a source of direct current having opposite polarity terminals across which said load is connected;
   a transistor connected between said source and said load;

a reactor comprising:
- a primary winding connected between said source and said load; and
- a secondary winding magnetically coupled to said primary reactor winding and adapted to apply a biasing voltage across a base and emitter of said transistor;

energy release circuit means through which the electrical energy stored in said reactor is released;

starting circuit means connected to the base of said transistor for supplying a starting current thereto;

base control circuit means also connected to the base of said transistor for controlling a base current thereof; and a voltage-dependent nonlinear resistance element connected between the base of said transistor and said secondary reactor winding; and a capacitor connected in parallel with said voltage dependent nonlinear resistance element;

whereby said transistor functions as a chopper to supply substantially stabilized direct current power to said load.

* * * * *